(12) United States Patent
Shin et al.

(10) Patent No.: US 11,005,106 B2
(45) Date of Patent: May 11, 2021

(54) ELECTRODE ASSEMBLY, SECONDARY BATTERY INCLUDING THE ELECTRODE ASSEMBLY, AND METHOD FOR MANUFACTURING THE ELECTRODE ASSEMBLY

(71) Applicant: LG Chem, Ltd., Seoul (KR)

(72) Inventors: Byung Heon Shin, Daejeon (KR); Woo Yong Lee, Daejeon (KR); Jong Hwa Park, Daejeon (KR)

(73) Assignee: LG Chem, Ltd.

( * ) Notice: Subject to any disclaimer, the term of this patent is extended or adjusted under 35 U.S.C. 154(b) by 105 days.

(21) Appl. No.: 16/349,439

(22) PCT Filed: Jul. 16, 2018

(86) PCT No.: PCT/KR2018/008041
§ 371 (c)(1),
(2) Date: May 13, 2019

(87) PCT Pub. No.: WO2019/017668
PCT Pub. Date: Jan. 24, 2019

(65) Prior Publication Data
US 2019/0273263 A1    Sep. 5, 2019

(30) Foreign Application Priority Data

Jul. 18, 2017 (KR) .................. 10-2017-0090977
Jul. 11, 2018 (KR) .................. 10-2018-0080734

(51) Int. Cl.
*H01M 4/78* (2006.01)
*H01M 4/04* (2006.01)
(Continued)

(52) U.S. Cl.
CPC ............... *H01M 4/78* (2013.01); *H01M 4/04* (2013.01); *H01M 4/13* (2013.01); *H01M 10/04* (2013.01);
(Continued)

(58) Field of Classification Search
CPC ...................................................... H01M 4/78
See application file for complete search history.

(56) References Cited

U.S. PATENT DOCUMENTS

2003/0017372 A1    1/2003  Probst et al.
2003/0108787 A1    6/2003  Endo et al.
(Continued)

FOREIGN PATENT DOCUMENTS

CN    206322790 U    7/2017
JP    H08153515 A    6/1996
(Continued)

OTHER PUBLICATIONS

International Search Report for PCT/KR2018/008041 dated Dec. 11, 2018.
(Continued)

*Primary Examiner* — Brian R Ohara
(74) *Attorney, Agent, or Firm* — Lerner, David, Littenberg, Krumholz & Mentlik, LLP

(57) ABSTRACT

Disclosed are an electrode assembly and a method for manufacturing the electrode assembly.
According to the present invention, the electrode assembly may be manufactured in consideration of deformation of the electrode assembly and a secondary battery due to a swelling phenomenon to improve assemblability and storage ability of the secondary battery having a curved surface with respect to electronic devices.
According to an aspect of the present invention for achieving the above effects, provided is an electrode assembly
(Continued)

having a curved surface, wherein a curvature radius ($R_e$) of each of ends of the curved surface is less than a curvature radius ($R_c$) of a central portion of the curved surface.

7 Claims, 4 Drawing Sheets

(51) Int. Cl.
*H01M 4/13* (2010.01)
*H01M 10/04* (2006.01)
*H01M 10/0565* (2010.01)
*H01M 10/058* (2010.01)
*H01M 4/02* (2006.01)

(52) U.S. Cl.
CPC ..... *H01M 10/058* (2013.01); *H01M 10/0565* (2013.01); *H01M 2004/021* (2013.01); *H01M 2220/30* (2013.01); *H01M 2300/0082* (2013.01); *H01M 2300/0085* (2013.01)

(56) References Cited

U.S. PATENT DOCUMENTS

| | | |
|---|---|---|
| 2006/0234115 A1 | 10/2006 | Watanabe et al. |
| 2007/0059595 A1 | 3/2007 | Endo et al. |
| 2012/0183825 A1 | 7/2012 | Lee et al. |
| 2014/0093762 A1* | 4/2014 | Goh ............ H01M 10/0436 429/94 |
| 2015/0113796 A1* | 4/2015 | Han ............ H01M 10/0436 29/623.1 |
| 2015/0118533 A1 | 4/2015 | Yi |
| 2015/0303413 A1 | 10/2015 | Yun |
| 2015/0333299 A1 | 11/2015 | Tsai et al. |
| 2016/0079571 A1 | 3/2016 | Seong |
| 2018/0254510 A1 | 9/2018 | Cho et al. |

FOREIGN PATENT DOCUMENTS

| | | |
|---|---|---|
| JP | H11273709 A | 10/1999 |
| JP | 2002170538 A | 6/2002 |
| JP | 2003162985 A | 6/2003 |
| JP | 2006294512 A | 10/2006 |
| JP | 2011202186 A | 10/2011 |
| KR | 20110073405 A | 6/2011 |
| KR | 20120024108 A | 3/2012 |
| KR | 20120082808 A | 7/2012 |
| KR | 20150049261 A | 5/2015 |
| KR | 20150050319 A | 5/2015 |
| KR | 20150128063 A | 11/2015 |
| KR | 20160032589 A | 3/2016 |
| KR | 20170021000 A | 2/2017 |
| KR | 20170030791 A | 3/2017 |
| WO | 2017090937 A1 | 6/2017 |

OTHER PUBLICATIONS

Extended European Search Report for Application No. EP18834582.1 dated Sep. 30, 2019—17 pages.
Partial Supplementary European Search Report including Written Opinion for Application No. EP18834582.1 dated Jun. 26, 2019.

* cited by examiner

ELECTRODE ASSEMBLY, SECONDARY BATTERY INCLUDING THE ELECTRODE ASSEMBLY, AND METHOD FOR MANUFACTURING THE ELECTRODE ASSEMBLY

CROSS-REFERENCE TO RELATED APPLICATION

The present application is a national phase entry under 35 U.S.C. § 371 of International Patent Application No. PCT/KR2018/008041, filed on Jul. 16, 2018, published in Korean, which claims priority from Korean Patent Application Nos. 10-2017-0090977, filed on Jul. 18, 2017, and 10-2018-0080734, filed on Jul. 11, 2018, the disclosures of all of which are hereby incorporated herein by reference in their entireties.

TECHNICAL FIELD

The present invention relates to an electrode assembly, a secondary battery including the electrode assembly, and a method for manufacturing the electrode assembly, and more particularly, to an electrode assembly having a structure that is minimized in deformation due to a swelling phenomenon of the electrode assembly, a secondary battery including the electrode assembly, and a method for manufacturing the electrode assembly.

BACKGROUND ART

Secondary batteries capable of being repeatedly chargeable and dischargeable may be provided in various types. In general, such a secondary battery includes an electrode assembly having a structure in which an electrode and a separator are alternately stacked.

The demand and type of electronic devices are increasing, and in particular, as the demand of electronic devices having an irregular shape, which deviates from the typical simple shape, increases, a secondary battery mounted on an electronic device having an irregular shape is also increasingly required to have an irregular shape.

The secondary battery having the irregular shape may have, for example, a curved surface. The secondary battery having the curved surface is often manufactured so as to form a certain radius of curvature.

The assembled secondary battery is subjected to a formation step of charging and discharging the secondary battery several times in order to form the secondary battery before the shipment. In the formation step, a swelling phenomenon in which the electrode assembly and the secondary battery are swollen to increase in volume of the secondary battery may occur generally.

As the swelling phenomenon occurs, the electrode assembly and the secondary battery may be deformed from an initially assembled form. Thus, there has been a problem that the secondary having an originally intended shape is not manufactured. Particularly, in case of a secondary battery having a curved surface having a constant curvature radius, an initial curvature radius and a curvature radius after the swelling are different from each other due to the swelling phenomenon to deteriorate assemblability and storage ability of the secondary battery with respect to electronic devices.

For example, in case of an electrode assembly having a curved surface as the assembled electrode assembly, the entire curvature radius of the curved surface after the swelling phenomenon occurs is greater than the entire curvature radius of the curved surface before the swelling phenomenon occurs (i.e., the curved surface formed on the electrode assembly is relatively flat due to the swelling phenomenon).

Particularly, deformation of the curved surface largely occurs at both ends of the curved surface. That is, even though the electrode assembly is assembled so that a central portion and each of both ends of the curved surface have the same curvature radius, the curvature radius at both ends of the curved surface may be greater than that at the central portion after the swelling (i.e., each of both ends of the electrode assembly is relatively more flat due to the swelling phenomenon).

DISCLOSURE OF THE INVENTION

Technical Problem

Thus, an object to be solved by the present invention is to improve assemblability and storage ability of a secondary battery having a curved surface with respect to electronic devices by manufacturing an electrode assembly in consideration of deformation of the electrode assembly and the secondary battery due to a swelling phenomenon.

Technical Solution

According to a first aspect of the present invention for achieving the above object, provided is an electrode assembly having a curved surface, wherein a curvature radius ($R_e$) of each of two opposite ends of the curved surface is less than a curvature radius ($R_c$) of a central portion of the curved surface between the ends.

The curvature radius $R_e$ may be 0.95 times to 0.99 times the curvature radius $R_c$.

According to a second aspect of the present invention for achieving the above object, an electrode assembly having a curved surface includes: a plurality of electrodes, each of which has a shape corresponding to a shape of the curved surface of the electrode assembly, wherein at least one electrode of the plurality of electrodes includes: a collector; and an electrode active material layer applied to each of first and second surfaces of the collector, wherein the first surface of the collector faces toward the curved surface of the electrode assembly, the second surface of the collector faces away from the curved surface of the electrode assembly, and a thickness of the electrode active material layer applied to the first surface is less than a thickness of the electrode active material layer applied to the second surface.

The thickness $t_1$ of the electrode active material layer applied to the first surface is 0.7 times to 0.9 times the thickness $t_2$ of the electrode active material layer applied to the second surface.

According to a third aspect of the present invention for achieving the above object, an electrode assembly having a curved surface includes: a plurality of electrodes, each of which has a shape corresponding to a shape of the curved surface of the electrode assembly, wherein at least one electrode of the plurality of electrodes includes: a collector; and an electrode active material layer applied to each of first and second surfaces of the collector, wherein the first surface of the collector faces toward the curved surface of the electrode assembly, the second surface of the collector faces away from the curved surface of the electrode assembly, and a non-coating portion of the first surface of the collector that is not coated with the electrode active material layer is disposed between adjacent portions of the electrode active material layer of the first surface.

The non-coating portion may be a first non-coating portion disposed between a first pair of the adjacent portions of the electrode active material layer, the first surface of the collector having a second non-coating portion disposed between a second pair of adjacent portions of the electrode active material layer, and a length of the electrode active material layer between the first and second non-coating portions and respective ends of the first surface of the collector may be 0.05 times to 0.3 times the total length of the electrode active material layer.

The non-coating portion may be a first non-coating portion disposed between first and second portions of the adjacent portions of the electrode active material layer, the first surface of the collector having a second non-coating portion disposed between the second portion and a third portion of the electrode active material layer, and a length of the second portion of the electrode active material layer between the first and second non-coating portions of the first surface may be 0.4 times to 0.9 times the total length of the electrode active material layer.

According to a fourth aspect of the present invention for achieving the above object, a method for manufacturing an electrode assembly includes: a forming step of forming the electrode assembly having a curved surface; and a charging/discharging step of charging and discharging the electrode assembly several times, wherein, during the forming step, an initial curvature radius $R_e$ of each of two opposite ends of the curved surface is less than an initial curvature radius $R_c$ of a central portion of the curved surface between the ends, so that a final difference between the final curvature radius ($r_e$) of the end of the curved surface and the final curvature radius ($r_c$) of the central portion of the curved surface after the charging/discharging step is less than an initial difference between the initial curvature radius ($R_e$) of the ends of the curved surface and the initial curvature radius ($R_c$) of the central portion of the curved surface before the charging/discharging step.

The initial curvature radius $R_e$ may be 0.95 times to 0.99 times the initial curvature radius $R_c$.

According to a fifth aspect of the present invention for achieving the above object, a method for manufacturing an electrode assembly includes: a forming step of forming the electrode assembly having a curved surface; and a charging/discharging step of charging and discharging the electrode assembly several times, wherein, during the forming step, an initial mean curvature radius ($R_a$) of the curved surface before the charging/discharging step is less than a final mean curvature radius ($r_a$) of the curved surface after the charging/discharging step.

According to a sixth aspect of the present invention for achieving the above object, an electrode assembly having a curved surface having two opposite ends and a central portion between the ends includes: a positive electrode comprising a positive electrode collector and a positive electrode active material layer formed on each of first and second opposite surfaces of the positive electrode collector; a negative electrode comprising a negative electrode collector and a negative electrode active material layer formed on each of first and second opposite surfaces of the negative electrode collector; a separator disposed between the positive electrode and the negative electrode; and a first polymer electrolyte layer disposed between the positive electrode and the separator and a second polymer electrolyte layer disposed between the negative electrode and the separator, wherein a curvature radius ($R_e$) each of the ends of the curved surface is less than a curvature radius ($R_c$) of the central portion of the curved surface.

The polymer electrolyte layers may each include a gel electrolyte in which a plasticizer is added to a polymer solid electrolyte.

According to a seventh aspect of the present invention for achieving the above object, a method for manufacturing an electrode assembly includes: a forming step of forming the electrode assembly having a curved surface; and a charging/discharging step of charging and discharging the electrode assembly several times, wherein, during the forming step, a top surface of the electrode assembly is pressed by an upper pressing device having a concave surface for pressing the top surface of the electrode assembly, and during the forming step, an initial mean curvature radius ($R_a$) of the curved surface before the charging/discharging step is less than a final mean curvature radius ($r_a$) of the curved surface after the charging/discharging step.

During the forming step, a bottom surface of the electrode assembly may be pressed by a lower pressing device having a convex surface for pressing the bottom surface of the electrode assembly.

During the forming step, a bottom surface of the electrode assembly may be pressed by a lower pressing device having a flat surface for pressing the bottom surface of the electrode assembly.

During the forming step, the electrode assembly may be pressed under conditions of a temperature of 80 degrees to 90 degrees Celsius and a pressure of 8 kgf/cm$^2$ to 12 kgf/cm$^2$ for a time period of 4 minutes to 6 minutes.

Advantageous Effects

According to the present invention, the electrode assembly may be manufactured in consideration of the deformation of the electrode assembly and the secondary battery due to the swelling phenomenon to improve the assemblability and the storage ability of the secondary battery having the curved surface with respect to the electronic devices.

MODE FOR CARRYING OUT THE INVENTION

Hereinafter, an electrode and a method for manufacturing the electrode assembly according to the present invention will be described with reference to the accompanying drawings.

Figure 1:
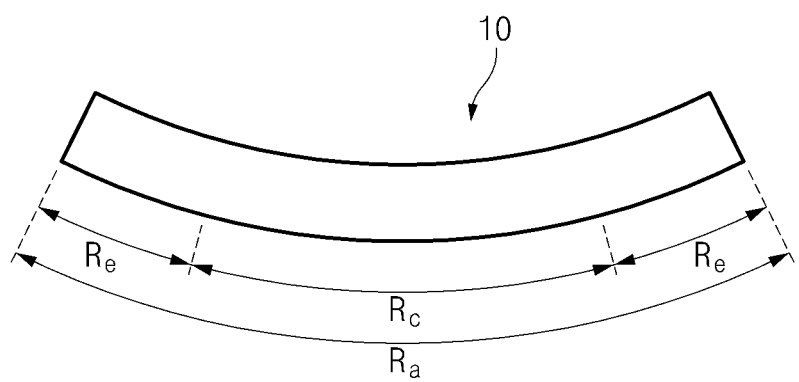
FIG. 1 is a side view illustrating a state of an electrode assembly before a swelling phenomenon occurs according to a first embodiment of the present invention.
Figure 2:
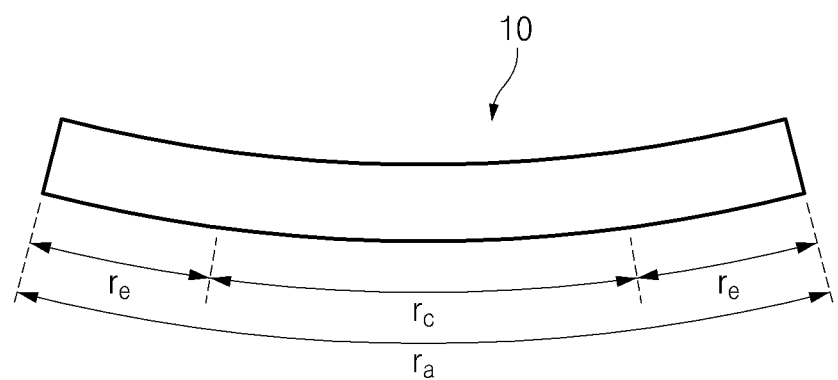
FIG. 2 is a side view illustrating a state of the electrode assembly after the swelling phenomenon according to the first embodiment of the present invention.

FIG. 1 is a side view illustrating a state of an electrode assembly before a swelling phenomenon occurs according to a first embodiment of the present invention, and FIG. 2 is a side view illustrating a state of the electrode assembly after the swelling phenomenon according to the first embodiment of the present invention.

An electrode assembly according to the present invention may have a structure in which a positive electrode, a separator, and a negative electrode are alternately disposed. Here, the positive electrode may include a positive electrode collector and a positive electrode active material layer formed on both surfaces of the positive electrode collector, and the negative electrode may include a negative electrode collector and a negative electrode active material layer formed on both surfaces of the negative electrode collector. The separator may be disposed between the positive electrode and the negative electrode.

Also, the electrode assembly according to the present invention may be an electrode assembly used for a polymer electrolyte secondary battery. Thus, the electrode assembly according to the present invention may further include a polymer electrolyte layer disposed between the positive electrode and the separator and between the negative electrode and the separator.

A polymer electrolyte forming the polymer electrolyte layer may be a polymer solid electrolyte. Alternatively, the polymer electrolyte may be a gel electrolyte in which a plasticizer is added to the polymer solid electrolyte.

As illustrated in FIGS. 1 and 2, a curved surface may be formed on the electrode assembly according to the present invention.

Here, the curved surface may have a predetermined curvature radius. That is, as illustrated in FIG. 1, the curved surface of the electrode assembly 10 before a swelling phenomenon occurs may have a mean curvature radius $R_a$ on the entire curved surface.

As illustrated in FIG. 1, the curved surface of the electrode assembly 10 may be divided into a central portion and both ends. Thus, the central portion and each of both the ends of the curved surface may have curvature radii $R_e$ and $R_c$, respectively. $R_e$ and $R_c$ may be equal to or different from each other. When $R_e$ and $R_c$ are equal to each other, $R_c$, $R_e$, and $R_a$ may be equal to each other. Also, although all of the curvature radii of both ends of the curved surface have the curvature radius $R_e$ in FIG. 1, this does not mean that the curvature radii of both the ends of the curved surface are necessarily the same. That is, the curvature radius of one end of the curved surface and the curvature radius of the other end of the curved surface may be different from each other according to process characteristics of the curved surface in a process of forming the curved surface.

In general, after the electrode assembly is manufactured, in order to realize formation of the secondary battery, a formation step of charging and discharging the secondary battery several times to allow the secondary battery to be in a usable state may be performed.

However, in the formation process, a swelling phenomenon in which the electrode assembly within the secondary battery increases in volume may occur. Since the electrode assembly increases in volume due to the swelling phenomenon, the electrode assembly may be changed in shape before and after the swelling phenomenon occurs. This leads to distortion in shape of the electrode assembly and the secondary battery.

When the swelling phenomenon occurs in the electrode assembly having a curved surface, a phenomenon in which an initial curvature radius of the electrode assembly varies may additionally occur. That is, as the swelling phenomenon occurs, a curvature radius of the curved surface of the electrode assembly after the swelling phenomenon occurs may become larger than that of the curved surface of the electrode assembly before the swelling phenomenon occurs. Particularly, as the swelling phenomenon occurs, the curved surface of the electrode assembly may be relatively flat. This may be understood that the curvature radius of the curved surface increases due to the swelling phenomenon.

Also, the flattening of the curved surface of the electrode assembly due to the swelling phenomenon may be relatively larger at both ends of the curved surface than at the central portion of the curved surface. This may be understood that a variation in curvature radius at each of both ends of the curved surface is larger than that in curvature radius at the central portion of the curved surface.

An object of the present invention is to solve the problem in which the initially intended characteristics (i.e., a curvature radius) of the curved surface of the electrode assembly are not achieved due to the swelling phenomenon.

Referring to FIGS. 1 and 2, a method for manufacturing the electrode assembly according to the first embodiment of the present invention may include a forming step of forming an electrode assembly 10 having a curved surface and a charging/discharging step of charging and discharging the electrode assembly 10 several times. In the forming step, the curved surface may be formed so that a mean curvature radius $R_a$ of the curved surface before the charging/discharging step is less than a mean curvature radius $r_a$ of the curved surface after the charging/discharging step. Here, $r_a$ may be a mean curvature radius, which is finally intended, of the electrode assembly.

According to the first embodiment of the present invention, the curved surface of the electrode assembly before the swelling phenomenon occurs is formed to be relatively large in consideration of a phenomenon in which the curved surface of the electrode assembly is relatively flat by the swelling phenomenon. Thus, the curvature radius of the electrode assembly after the formation step may match the curvature radius of the electrode assembly, which is originally designed.

According to a modified example of the first embodiment of the present invention, in the forming step, a curvature radius $R_e$ at an end of the curved surface before the charging/discharging step may be less than a curvature radius $R_c$ at the central portion of the curved surface before the charging/discharging step.

As described above, the curvature radius of the curved surface of the electrode assembly may increase by the swollen shape of the electrode assembly having the curved surface (e.g., the curved surface becomes relatively flat). The increase in curvature radius is relatively larger at both ends of the curved surface than at the central portion of the curved surface.

Thus, according to the modified example of the first embodiment of the present invention, in the forming step of forming the curved surface of the electrode assembly, the curvature radius $R_e$ may be formed to be smaller than the curvature radius $R_c$ so that a difference between the curvature radii $r_e$ and $r_c$ is smaller than a difference between the curvature radii $R_e$ and $R_c$ to manufacture the electrode assembly on which a curved surface having a constant curvature radius is formed.

Here, the curvature radius $R_e$ may be formed to have a ratio within a predetermined range with respect to the curvature radius $R_c$. For example, the curvature radius $R_e$ may be 0.95 times to 0.99 times of the curvature radius $R_c$. When the curvature radius $R_e$ is less than 0.95 times of the curvature radius $R_c$, since the curvature radius $r_e$ is still less than the curvature radius $r_c$ after the swelling phenomenon occurs, both the ends of the curved surface may be excessively curved. Also, when the curvature radius $R_e$ exceeds 0.99 times of the curvature radius $R_c$, since the curvature radius is recessively larger than the curvature radius $r_c$ after the swelling phenomenon occurs, both ends of the curved surface become excessively flat, and thus, the problem according to the related art may not be solved. More preferably, the curvature radius $R_e$ may be 0.96 times to 0.98 times of the curvature radius $R_c$.

Also, the curvature radius $R_e$ may be formed to have a difference within a predetermined range with to the curvature radius $R_c$. For example, the curvature radius $R_e$ may be less 4 mm to 8 mm than the curvature radius $R_c$. When the curvature radius $R_e$ is less than the curvature radius $R_c$ by less than 4 mm, since the curvature radius is recessively larger than the curvature radius $r_c$ after the swelling phenomenon occurs, both ends of the curved surface become excessively flat, and thus, the problem according to the related art may not be solved. Also, when the curvature radius $R_e$ is less than the curvature radius $R_c$ by more than 8 mm, since the curvature radius $r_e$ is still small than the curvature radius $r_c$ after the swelling phenomenon occurs, both the ends of the curved surface may be excessively curved. More preferably, the curvature radius $R_e$ may be less 5 mm to 7 mm than the curvature radius $R_c$.

In the forming step according to the first embodiment of the present invention, the top and bottom surfaces of the electrode assembly may be pressed together with each other by the upper pressing device and the lower pressing device. A surface of the upper pressing device, which presses the top surface of the electrode assembly, may have a concave surface or may be provided with only the concave surface. Also, a surface of the lower pressing device, which presses the bottom surface of the electrode assembly, may have a convex surface. Alternatively, the surface of the lower pressing device, which presses the bottom surface of the electrode assembly, may have a convex surface or may be provided with only the convex surface. On the other hand, the surface of the lower pressing device, which presses the bottom surface of the electrode assembly, may have a flat surface or may be provided with only the flat surface. Alternatively, the surface of the lower pressing device, which presses the bottom surface of the electrode assembly, may have all of the convex surface and the flat surface. For example, the flat surface may be disposed at a central portion of the surface of the lower pressing device, which presses the bottom surface of the electrode assembly, and the convex surface may be disposed at the peripheral portion of the surface of the lower pressing device.

Also, in the forming step, the electrode assembly may be pressed under conditions of a specific temperature, pressure, and time. In the forming step, the electrode assembly may be pressed at a temperature of 80 degrees to 90 degrees Celsius and a pressure of 8 kgf/cm$^2$ to 12 kgf/cm$^2$ for a time period of 4 minutes to 6 minutes. For example, in the forming step, the electrode assembly may be pressed under conditions of a temperature of 85 degree and a pressure of 10 kgf/cm$^2$ for a time period of 5 minutes.

The above-described contents with respect to the forming step, the upper pressing device and the lower pressing device may be equally applied to following second and third embodiments of the present invention.

Figure 3:
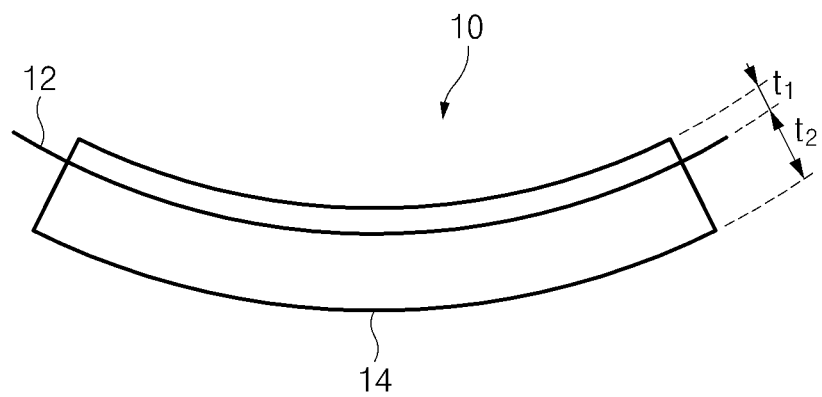
FIG. 3 is a side view illustrating an electrode of an electrode assembly according to a second embodiment of the present invention.

FIG. 3 is a side view illustrating an electrode of an electrode assembly according to a second embodiment of the present invention.

Like the first embodiment of the present invention, the second embodiment of the present invention is also intended to solve the problem caused by a variation in curvature radius of the curved surface of the electrode assembly due to the swelling phenomenon.

Referring to FIG. 3, an electrode 10 constituting an electrode assembly may include a collector 12 and an electrode active material layer 14 applied to each of both surfaces of the collector 12.

Since a curved surface is formed on the electrode assembly according to the present invention, a curved surface having a shape corresponding to that of the curved surface of the electrode assembly may be formed on the electrode 10 constituting the electrode assembly. Thus, the electrode active material layer 14 may be applied to a first surface (i.e., a top surface of a collector 12 in FIG. 3) provided to face the inside of the curved surface formed on the electrode 10 with respect to the collector 12 and a second surface (i.e., a bottom surface of the collector 12 in FIG. 3) provided to face the outside of the curved surface formed on the electrode 10 with respect to the collector 12.

Here, the electrode active material layer applied to the first surface of the electrode 11 of the electrode assembly according to the second embodiment of the present invention may have a thickness $t_1$ different from a thickness $t_2$ of the electrode active material layer applied to the second surface. For example, the thickness $t_1$ may be less than the thickness $t_2$.

According to the second embodiment of the present invention, the electrode active material layer may be applied so that the thickness $t_1$ is less than the thickness $t_2$ to prevent the electrode from being flattened when a swelling phenomenon occurs.

That is, the more the thickness of the electrode active material layer applied to the first surface provided to face the inside of the curved surface formed on the electrode with respect to the collector increases, the more the electrode tends to expand again due to the thickness of the electrode active material layer applied to the first surface. This adversely affects the shape maintenance of the electrode assembly having the curved surface. Thus, according to the second embodiment of the present invention, the electrode active material layer may be applied so that the thickness $t_1$ is less than the thickness $t_2$ to prevent the electrode from being flattened when a swelling phenomenon occurs.

In similar to the first embodiment of the present invention, the thickness $t_1$ may also have a ratio within a predetermined range with respect to the thickness $t_2$. For example, the thickness $t_1$ may be 0.7 times to 0.9 times of the thickness $t_2$. When the thickness $t_1$ is less than 0.7 times of the thickness $t_2$, the thickness of the electrode active material layer applied to the second surface may be excessively large, and thus, the electrode assembly may be more curved. On the other hand, when the thickness $t_1$ exceeds 0.9 times of the thickness $t_2$, the flattening of the electrode assembly may be effectively prevented.

Figure 4:
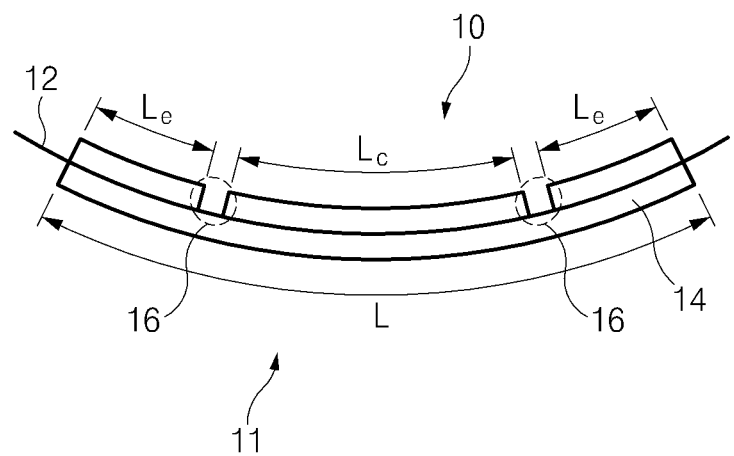
FIG. 4 is a side view illustrating an electrode of an electrode assembly according to a third embodiment of the present invention.

FIG. 4 is a side view illustrating an electrode of an electrode assembly according to a third embodiment of the present invention.

Like the first and embodiments of the present invention, the third embodiment of the present invention is also intended to solve the problem caused by a variation in curvature radius of the curved surface of the electrode assembly due to the swelling phenomenon.

Referring to FIG. 4, an electrode 10 constituting the electrode assembly may include a collector 12 and an electrode active material layer 14 applied to each of both surfaces of the collector 12. Also, since the electrode 10 having a curved surface and first and second surfaces coated with the electrode active material layer are basically the same as those according to the second example of the present invention and FIG. 3, their descriptions are derived from those according to the second embodiment of the present invention.

A non-coating portion, which is not coated with the electrode active material layer, may be formed between the electrode active material layers on the electrode of the electrode assembly according to the third embodiment of the present invention. As illustrated in FIG. 4, the non-coating portion 16 may be formed on the first surface.

According to the third embodiment of the present invention, the non-coating portion may be formed on the first surface to form an empty space between the electrode active material layers applied to the first surface. The empty space between the electrode active material layers may prevent the electrode assembly from being flattened again. That is, when the electrode active material layer is also applied to the non-coating portion of the first surface, since a curved surface is formed on the electrode assembly, the electrode active material layer applied on the corresponding non-coating layer of the first surface may be pressed. In this case, the electrode active layer applied to the corresponding non-coating portion of the first surface may be expanded by restoring force. Thus, the electrode assembly may intend to be expanded again.

Thus, according to the third embodiment of the present invention, since the non-coating portion is formed on the first surface to minimize the tendency of the electrode active material layer applied to the first surface to be expanded again by the restoring force, thereby maintaining the electrode assembly having the curved surface as it is.

Also, the non-coating portion 16 may be provided in plurality. FIG. 4 illustrates a case in which two non-coating portions 16 are formed. Also, the electrode active material layers applied to the first surface may be spaced apart from each other by the non-coating portion 16. Thus, a plurality of electrode active material layers may be formed on the first surface.

The electrode active material layer applied to the collector 12 may have a predetermined length L. Particularly, as described above, the non-coating portion 16 is formed on the first surface, and the plurality of electrode active material layers may be formed on the first surface by the non-coating portion 16. Thus, each of the plurality of active material layers formed on the first surface may have a length. In this specification, a length of the electrode active material layer, which is formed on the center of the first surface, of the plurality of active material layers formed on the first surface is called $L_c$, and a length of the electrode active material layer formed on each of both ends of the first surface is called $L_e$.

In the electrode 10 of the electrode assembly according to the third embodiment of the present invention, the length (i.e., $L_e$) of the electrode active material layer, which is formed on one end or each of both ends of the first surface, of the plurality of electrode active material layers applied to the first surface may have a ratio within a predetermined range with respect to the total length (i.e., L) of the plurality of electrode active material layer applied to the first surface. For example, the length $L_e$ may be 0.05 times to 0.3 times of the length L.

When the length $L_e$ is less than 0.05 times of the length L, both ends of the electrode assembly may be excessively curved after the swelling phenomenon occurs. When the length $L_e$ exceeds 0.05 times of the length L, both ends of the electrode assembly may be excessively flat after the swelling phenomenon occurs, and thus, it may be difficult to solve the problem according to the related art.

As described above, in the electrode 10 of the electrode assembly according to third embodiment of the present invention, the two non-coating portions 16 are formed on the first surface, and the electrode active material layers applied to the first surface may be spaced apart from each other by the two non-coating portions to form three electrode active material layers.

Here, in the electrode 10 of the electrode assembly according to the third embodiment of the present invention, a length (i.e., $L_c$) of the electrode active material layer, which is formed at a center of the first surface, of the plurality of electrode active material layers applied to the first surface may have a ratio within a predetermined range with respect to the total length (i.e., L) of the plurality of electrode active material layer applied to the first surface. For example, the length $L_c$ may be 0.4 times to 0.9 times of the length L.

When the length $L_c$ is less than 0.4 times of the length L, both ends of the electrode assembly may be excessively flat after the swelling phenomenon occurs. When the length $L_c$ exceeds 0.9 times of the length L, both ends of the electrode assembly may be excessively curved after the swelling phenomenon occurs, and thus, it may be difficult to solve the problem according to the related art.

The electrode assembly according to the present invention may be an electrode assembly inserted into a can or a pouch of a can type secondary battery or a pouch type secondary battery. That is, the present invention may be an invention related to the can type secondary battery or the pouch type secondary battery.

When the secondary battery according to the present invention is the pouch type secondary battery, the pouch accommodating the electrode assembly may have a multi-layered structure respectively made of a plurality of materials. For example, the pouch may include an aluminum layer, and a polyolefin resin layer provided on the upper and lower portions of the aluminum layer, respectively. For example, polyolefin may be polypropylene.

Example 1

After the electrode assembly is manufactured, an electrode assembly was pressed by a pressing presser to form a curved surface of each of top and bottom surfaces of the electrode assembly. In curvature radii of ends of the curved surface of the electrode assembly manufactured according to Example 1, a curvature radius $R_e$ (left) of a left end was 195 mm, and a curvature radius $R_e$ (right) of a right end was 195 mm. Also, a curvature radius $R_c$ of a central portion was 200 mm.

Example 2

An electrode assembly was manufactured in the same method as in Example 1, except that, in curvature radii of ends of a curved surface of the electrode assembly, a curvature radius $R_e$ (left) of a left end was 194 mm, a curvature radius $R_e$ (right) of a right end was 195 mm, and a curvature radius $R_c$ of a central portion of the curved surface was 201 mm.

Example 3

An electrode assembly was manufactured in the same method as in Example 1, except that, in curvature radii of ends of a curved surface of the electrode assembly, a curvature radius $R_e$ (left) of a left end was 195 mm, a curvature radius $R_e$ (right) of a right end was 196 mm, and a curvature radius $R_c$ of a central portion of the curved surface was 200 mm.

Comparative Example 1

An electrode assembly was manufactured in the same method as in Example 1, except that, in curvature radii of ends of a curved surface of the electrode assembly, a curvature radius $R_e$ (left) of a left end was 188 mm, a curvature radius $R_e$ (right) of a right end was 188 mm, and a curvature radius $R_c$ of a central portion of the curved surface was 200 mm.

Comparative Example 2

An electrode assembly was manufactured in the same method as in Example 1, except that, in curvature radii of ends of a curved surface of the electrode assembly, a curvature radius $R_e$ (left) of a left end was 201 mm, a curvature radius $R_e$ (right) of a right end was 201 mm, and a curvature radius $R_c$ of a central portion of the curved surface was 197 mm.

Experimental Example

Each of the electrode assemblies manufactured according to Examples and Comparative Examples was repeatedly changed and discharged to perform a formation process. The formation process was performed through charging and discharging 300 times at a temperature of 45° C. The charging of the formation process was performed under constant current of 1.0 C and a voltage of 4.4 V, and when the charging is completed, current was 122 mA. The discharging of the formation process was performed under constant current of 1.0 C, and when the discharging is completed, a voltage was 3.0 V.

After the formation process is completed, the curvature radius of the curved surface formed on the electrode assembly was measured. The curvature radius of the curved surface of the electrode assembly measured before and after the formation process was summarized in Table 1 below. In the curvature radius of the curved surface of the electrode assembly after the formation process, a curvature radius of a left end was expressed as $r_e$ (left), a curvature radius of a right end was expressed as $r_e$ (right), and a curvature radius of a central portion of a curved surface was expressed as $r_c$.

TABLE 1

| | $R_e$ (left) | $R_c$ | $R_e$ (right) | $r_e$ (left) | $r_c$ | $r_e$ (right) |
|---|---|---|---|---|---|---|
| Example 1 | 195 mm | 200 mm | 195 mm | 210 mm | 210 mm | 208 mm |
| Example 2 | 194 mm | 201 mm | 195 mm | 209 mm | 211 mm | 208 mm |
| Example 3 | 195 mm | 200 mm | 196 mm | 209 mm | 210 mm | 211 mm |
| Comparative Example 1 | 188 mm | 200 mm | 188 mm | 202 mm | 208 mm | 203 mm |
| Comparative Example 2 | 201 mm | 197 mm | 201 mm | 212 mm | 209 mm | 214 mm |

Referring to Table 1, when the electrode assembly is manufactured according to Example 1 to 3, it is seen that the curvature radius of the electrode assembly is uniformly formed over the entire area of the ends and the central portion of the curved surface. Particularly, in the case of the electrode assembly manufactured according to Examples, a difference between the curvature radii $r_e$ and $r_c$ is up to 3 mm. On the other hands, in the case of the electrode assembly manufactured according to Comparative Examples, a difference between the curvature radii $r_e$ and $r_c$ is up to 6 mm Thus, it is seen that when the electrode assembly is manufactured according to Examples, a uniform curvature radius is formed over the entire curved surface of the electrode assembly.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, the method comprising:
   forming the electrode assembly having a curved surface; and
   charging and discharging the electrode assembly several times,
   wherein, during the forming step, an initial curvature radius $R_e$ of each of two opposite ends of the curved surface is less than an initial curvature radius $R_c$ of a central portion of the curved surface between the ends, so that a final difference between a final curvature radius ($r_e$) of ends of the curved surface and a final curvature radius ($r_c$) of the central portion of the curved surface after the charging and discharging step is less than an initial difference between the initial curvature radius ($R_e$) of the ends of the curved surface and the initial curvature radius ($R_c$) of the central portion of the curved surface before the charging and discharging step.

2. The method of claim 1, wherein the initial curvature radius $R_e$ is 0.95 times to 0.99 times of the initial curvature radius $R_c$.

3. The method of claim 1,
   wherein, during the forming step, an initial mean curvature radius ($R_a$) of the curved surface before the charging and discharging step is less than a final mean curvature radius ($r_a$) of the curved surface after the charging and discharging step.

4. The method of claim 3,
   wherein, during the forming step, a top surface of the electrode assembly is pressed by an upper pressing device having a concave surface.

5. The method of claim 4, wherein, during the forming step, a bottom surface of the electrode assembly is pressed by a lower pressing device having a convex surface.

6. The method of claim 4, wherein, during the forming step, a bottom surface of the electrode assembly is pressed by a lower pressing device having a flat surface.

7. The method of claim 4, wherein, during the forming step, the electrode assembly is pressed under conditions of a temperature of 80 degrees to 90 degrees Celsius and a pressure of 8 kgf/cm² to 12 kgf/cm² for a time period of 4 minutes to 6 minutes.

* * * * *